(12) United States Patent
Barnhill

(10) Patent No.: US 8,439,279 B2
(45) Date of Patent: May 14, 2013

(54) STONE WATERFALL WITH INTEGRATED PLANTER AND WATER DISTRIBUTION SYSTEM

(76) Inventor: Philip Scott Barnhill, Lexington, KY (US)

( * ) Notice: Subject to any disclaimer, the term of this patent is extended or adjusted under 35 U.S.C. 154(b) by 588 days.

(21) Appl. No.: 12/713,693

(22) Filed: Feb. 26, 2010

(65) Prior Publication Data

US 2010/0170960 A1 Jul. 8, 2010

Related U.S. Application Data

(63) Continuation-in-part of application No. 11/638,258, filed on Dec. 13, 2006, now abandoned, which is a continuation-in-part of application No. 11/521,894, filed on Sep. 15, 2006, now abandoned.

(60) Provisional application No. 60/749,898, filed on Dec. 14, 2005.

(51) Int. Cl.
*F21S 8/00* (2006.01)

(52) U.S. Cl.
USPC ............................................ 239/17; 239/20

(58) Field of Classification Search ............ 239/16, 239/17, 124, 125, 289, 20; 47/39, 66.6
See application file for complete search history.

(56) References Cited

U.S. PATENT DOCUMENTS

| | | | |
|---|---|---|---|
| 3,409,223 A | 11/1968 | Gosh | |
| 3,901,439 A | 8/1975 | Willis | |
| 4,349,293 A | 9/1982 | Rosenberger | |
| 5,167,368 A | 12/1992 | Nash | |
| 5,571,409 A | 11/1996 | Scarborough | |
| 5,732,656 A | 3/1998 | Tran | |
| 5,820,022 A * | 10/1998 | Fukano et al. | 239/17 |
| 6,149,070 A | 11/2000 | Hones | |
| 6,290,144 B1 | 9/2001 | Maxwell | |
| 6,382,520 B1 | 5/2002 | Hones | |
| 6,849,031 B2 | 2/2005 | Paci | |
| 7,214,002 B2 | 5/2007 | Laine | |

* cited by examiner

*Primary Examiner* — Davis Hwu
(74) *Attorney, Agent, or Firm* — Michael Coblenz

(57) ABSTRACT

A decorative portable natural stone waterfall containing an integrated planter and a water distribution system is disclosed. The waterfall is made of natural stone, but is small enough to be portable. The waterfall contains a planter integrated within the main body of the waterfall which is designed to contain a living plant. There is also a water distribution system that contains a water inlet, a distribution chamber and a multiplicity of water distribution tubing that supplies water to the face of the waterfall. In one configuration there is also a pump and a means for recirculation the water, and in another the water is supplied by an external source. In one configuration the water is supplied to the top section of the waterfall, and in another configuration the water is supplied directly to the face of the waterfall. The invention also consists of a kit comprising the planter with integrated water distribution system, along with stone and mortar for constructing the waterfall.

14 Claims, 4 Drawing Sheets

STONE WATERFALL WITH INTEGRATED PLANTER AND WATER DISTRIBUTION SYSTEM

CROSS REFERENCE TO RELATED APPLICATIONS

This application is a continuation-in-part of U.S. patent application Ser. No. 11/638,258 filed Dec. 13, 2006, which was a continuation-in-part of U.S. patent application Ser. No. 11/521,894 filed Sep. 15, 2006, and also claims priority to U.S. provisional application Ser. No. 60/749,898, filed on Dec. 14, 2005 and incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to a decorative portable natural stone waterfall incorporating an integrated planter and water distribution system.

2. Description of the Related Art

There are many decorative fountains and waterfalls known in the art. Many are large and used as outdoor decoration and water features, and many others are smaller and used as indoor decorations. In general, the larger outdoor fountains are frequently made of natural materials such as stone, while the indoor waterfalls, due to their size, are generally made of non-natural materials.

Examples of small decorative indoor waterfalls include U.S. Pat. No. 3,901,439 to Wallis, which discloses a small, plastic cast waterfall with an internal pump and tubing that supplies water to the top of the fixture. U.S. Pat. No. 5,167,368 to Nash, which discloses a decorative waterfall with an internal pumping mechanism that delivers water to an upper reservoir so that the water flows down a flat wall. In one embodiment the wall has numerous recesses which help to create the sound of flowing water. U.S. Pat. No. 5,571,409 to Scarborough, discloses a small waterfall for use with an aquarium. In one embodiment of the invention the water flows down a small wall molded from thermoplastic to simulate a rock-like wall. U.S. Pat. No. 5,732,656 to Tran, discloses a small waterfall for aquariums. The waterfall, which is designed for use inside the aquarium, and therefore under the water, uses sand rather than water to provide the flowing material and is made from small natural or ceramic stone. U.S. Pat. No. 6,149,070 to Hones, discloses a small decorative waterfall. The primary feature of the waterfall is that it provides a substantially continuous film of water or liquid flowing over a lip which creates a small wall of water. U.S. Pat. No. 6,290,144 to Maxwell discloses a small decorative waterfall having a circular conduit for water to flow around a central post. It also has a number of posts that extend outward from the conduit to allow some water to trickle out from the conduit. Finally, U.S. Pat. No. 6,382,520 to Hones, which is a continuation-in-part of the '070 patent also to Hones, discloses a small decorative waterfall that is designed to create a continuous unbroken wall of water.

There are also a number of large water features, all of which are made from natural or cast stone. These include U.S. Pat. No. 3,409,223 to Gosh, which discloses a pump mechanism that sits in a pond, and stones that can be set around the pump mechanism to create the look of a small waterfall. The Gosh patent is clearly drawn to a waterfall that is non-movable and permanent in the ground. U.S. Pat. No. 4,349,293 to Rosenberger discloses a group of stone pillars, at least one of which has a fountain incorporated into the top. This allows water to spay up, and then flow down, the stone pillars. The stone pillars are of significant size, and as a result the Rosenberger invention is essentially fixed and non-portable.

One of the features of the present invention is that it incorporates a living plant within the water feature. There are a couple of existing patents that include planters within the water feature, but are significantly different in their configuration from the Barnhill invention. For example, U.S. Pat. No. 4,349,293 to Rosenberger discloses a group of stone pillars, at least one of which has a fountain incorporated into the top. At least one of the other pillars contains a planter in the top. This incorporates a planter with the fountain, however the problem with this configuration is that the planter is below the fountain, which means that the water from the fountain can potentially enter the planter and potentially drown the plant. One configuration of the Hones '520 patent, described above, includes a planter placed behind the wall of water. This is a unique feature, but it is quite possible that the water could enter the planter and potentially drown the plant.

The preceding prior art waterfalls are all artistic, decorative, and in many cases provide the soothing sound of flowing water. But none has the appearance of a simulated miniature natural waterfall. Additionally, none incorporates an integrated planter for holding living plants. Finally, none incorporates an internal water distribution system that delivers water directly to multiple faces of the waterfalls. There is a need, therefore, for a freestanding miniature natural waterfall with an integrated planter and incorporates a water distribution system that protects the plant from the water.

BRIEF SUMMARY OF THE INVENTION

It is an object of the invention to provide a small decorative fountain and waterfall made from natural stone. In the preferred embodiment of the invention the waterfall is made from such stone material as limestone, slate, sandstone, marble, granite, or other suitable stone material. In one embodiment of the invention water flows down one wall of the waterfall, but in other embodiments of the invention, water can flow down any or all sides or exterior faces of the waterfall.

It is a further object of this invention to provide a decorative fountain and waterfall containing an integrated planter placed within the pedestal that comprises the main portion of the waterfall. This combines the features of the waterfall described herein with the decorative feature of a living plants. In this configuration, water is supplied directly to the walls of the waterfall through an integrated water distribution system. The water distribution system consists of an insert that contains the planter, and water distribution tubing around the planter. The water distribution system further consists of a central distribution chamber that receives water from a water supply source, and a series of distribution tubes attached to the distribution chamber. Water flows from the distribution chamber into the tubes, and the tubes supply water directly to the face of the waterfall, to give the waterfall the appearance of a natural waterfall.

It is a further object of the invention to provide decorative features within the waterfall. To that end, indicia can be constructed into the waterfall. This can be accomplished by providing stone of a different color, and integrating that within the stonework of the waterfall. It is a further object of the invention to provide a plaque integrated into the waterfall. The plaque can be made from a variety of different materials. The plaque can contain any variety of written or symbolic information, such as the street name and number for a house, or the name of a family. It could also contain a variety of honoraria, or memorial information. In the most preferred embodiment the plaque would be made of stone material into which words or symbols are carved or etched. This plaque would be integrated into the waterfall in a manner familiar in the stone masonry arts. It is also within the conception of the invention that the plaque would be removable inserted into a plaque frame, and the plaque frame would be mounted into the blocks of the waterfall.

It is a further object of the invention to provide a kit for constructing the stone waterfall with an integrated planter and water distribution system. The kit would consist of the unitary, one piece planter with the water distribution system mounted directly on to it. It would also consist of instructions to build a waterfall out of stone around the integrated planter and water distribution system, and instructions on how to arrange the components to provide water to the face of the waterfall. In one variation the kit would include the stone and mortar necessary for constructing the waterfall.

These and other aspects, features and advantages of the present invention will become apparent from the following detailed description taken in conjunction with the accompanying drawings.

DETAILED DESCRIPTION OF THE INVENTION

Detailed embodiments of the present invention are disclosed herein. It is to be understood, however, that the disclosed embodiments are merely exemplary of the invention and that the invention may be embodied in various and alternative forms. Therefore, specified structural and functional details disclosed herein are not to be interpreted as limitations, but merely as a basis for the claims and as a representative basis for teaching one skilled in the art to variously employ the present invention.

Figure 1:
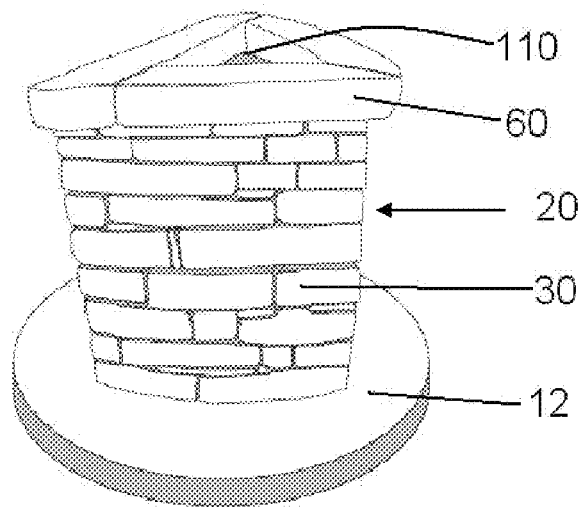
FIG. 1 is a perspective view of the waterfall with integrated planter visible.

Referring now in more detail to the drawings, FIG. 1 shows the waterfall 10 which is comprised of a base 12 and a pedestal 20. In the preferred embodiment, the pedestal 20 is constructed from a multiplicity of natural stone blocks 30. In the preferred embodiment the multiplicity of blocks 30 are made of cut or hewn natural stone. In the most preferred embodiment, the multiplicity of blocks 30 are small flat pieces of limestone. In alternate embodiments, the multiplicity of blocks 30 can be made of virtually any other type of stone, although stone that naturally occurs in flat sheets, such as slate, limestone or sandstone, will work best. It is also within the conception of the invention to cut stone from the types of stone that does not come naturally in flat sheets, such as marble or granite, to make the multiplicity of blocks 30. It is also within the conception of the invention to make the multiplicity of blocks 30 from stone aggregates such as concrete. Making the multiplicity of blocks 30 from such aggregates would allow the addition of color to some or all of the blocks 30.

In the most preferred embodiment, the multiplicity of blocks 30 are substantially flat. In the most preferred embodiment, the multiplicity of blocks 30 are made from small flat pieces of limestone measuring approximately one inch thick, and approximately four inches by six inches. The multiplicity of blocks 30 will generally not be of uniform size or shape. This lack of uniformity will give the pedestal 20 the look of a naturally occurring rock formation. The multiplicity of blocks 30 are connected to one another by any conventional grout, mortar, or adhesive means well known in the stone and masonry arts. In a preferred embodiment, the multiplicity of blocks 30 are connected by means of conventional mortar made of sand and Portland cement. In the most preferred embodiment the blocks are connected with the mortar placed in the back of the blocks such that the mortar is not seen from the face 25 of the pedestal.

The exterior surfaces of the blocks 30 of the pedestal 20 form a multiplicity of faces 25. Each side of the pedestal 20 has a face 25. In the embodiment depicted in FIG. 1 the pedestal 20 is roughly triangular in shape, with three sides, and therefore three faces 25. In other configurations, for example if the pedestal is essentially cylindrical in shape, there will be one continuous face 25 around the entire exterior surface of the pedestal 20. In other embodiments, the pedestal 20 can be constructed in an uneven or ramshackled manner, creating a variety of uneven and varying shaped faces 25. The pedestal 20 could be virtually any three dimensional shape, whether conic, cylindrical, block-like, or ramshackled. In one embodiment of the invention the pedestal 20 is approximately twelve inches in height and approximately twelve inches wide and twelve inches deep where it connects to the base 12, and because it bevels upward, the top 24 of the pedestal is approximately ten inches wide by ten inches deep. This size pedestal 20 in conjunction with the size of the blocks 30 described above, gives the waterfall 10 the appearance of a miniature natural waterfall. In many natural waterfalls, particularly those found in areas where the subsurface of the ground consists of limestone, natural waterfalls are often many feet wide and many feet high. The blocks 30 of the disclosed waterfall 10 are sized to have approximately the same relationship to the overall size of the pedestal 20 as the stones in a natural waterfall have to the overall size of the natural waterfall.

In another embodiment of the invention, as depicted in FIG. 1, the pedestal 20 is approximately four feet high, with each face 25 approximately three feet wide. These sizes are representative only, and the pedestal can be just about any size, from barely twelve inches high, to as large as five feet tall. In the embodiment of the invention shown in FIG. 1, there are a multiplicity of cap stones 60 around the top portion of the pedestal 20. The cap stones 60 are generally larger than the blocks 30, so that there are fewer seems between the stones 60 at the top than between the other blocks 30.

Figure 7:
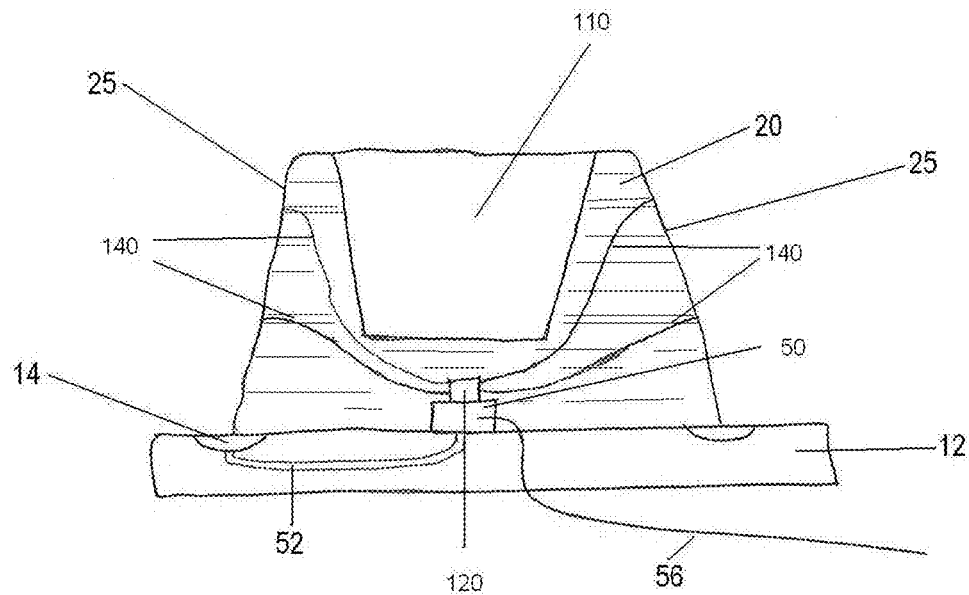
FIG. 7 is a cut away section of an alternate embodiment of the waterfall with integrated planter and water distribution system.

The pedestal 20 sets on, and is connected to, a base 12. The base 12 can be made of any variety of sturdy material, but in the preferred embodiment the base 12 is a single piece of limestone. In alternate embodiments, the base 12 can be cast out of concrete. In one configuration of the invention, shown in FIG. 7, there is a catch basin 14 within the base 12 at the bottom of the pedestal 20. In this configuration the catch basin 14 consists of a groove or indent that runs along the entire perimeter of the bottom of the pedestal 20 where it intersects the base 12. In this configuration, as depicted in FIG. 7, the catch basin 14 runs along the entire perimeter of the pedestal 20, which in the embodiment depicted in FIG. 7 is the entire length and width of the pedestal 20. Also in this configuration there will be one portion of the catch basin 14 that is lower than the rest of the catch basin 14 to allow water to flow to that area.

Figure 2:
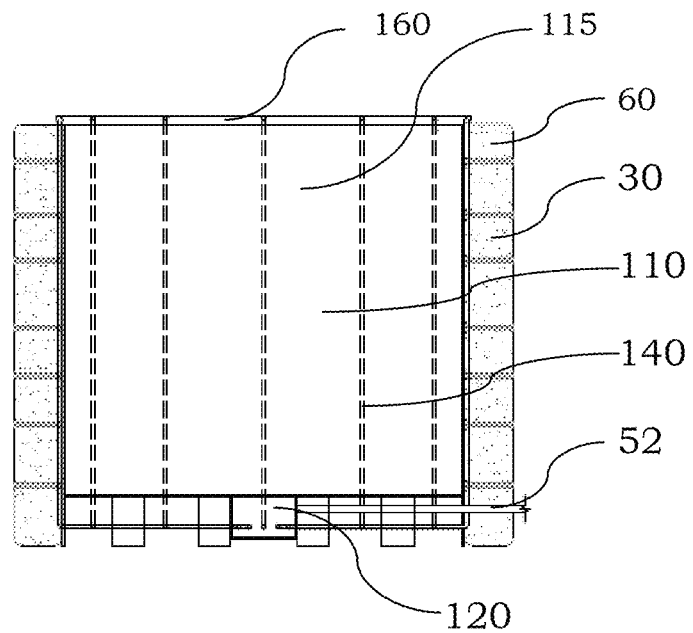
FIG. 2 is a cut away section view of the interior of the waterfall showing the integrated planter and water distribution system.
Figure 3:
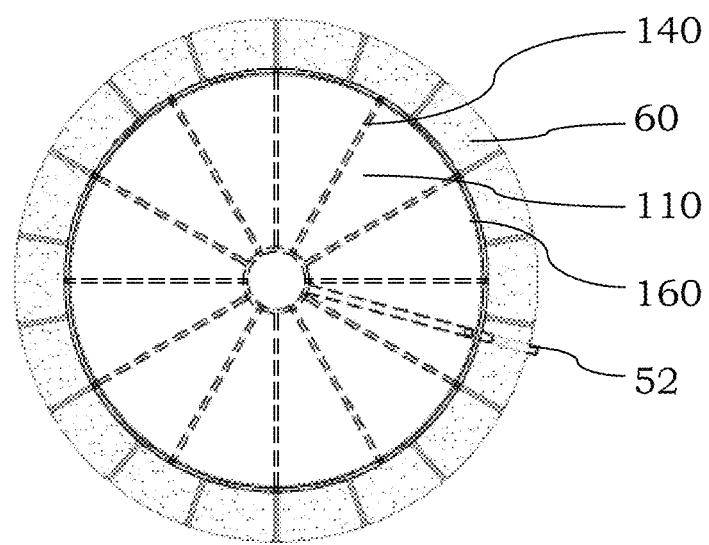
FIG. 3 is a top plan view of the waterfall showing the orientation of the water distribution tubing.
Figure 4:
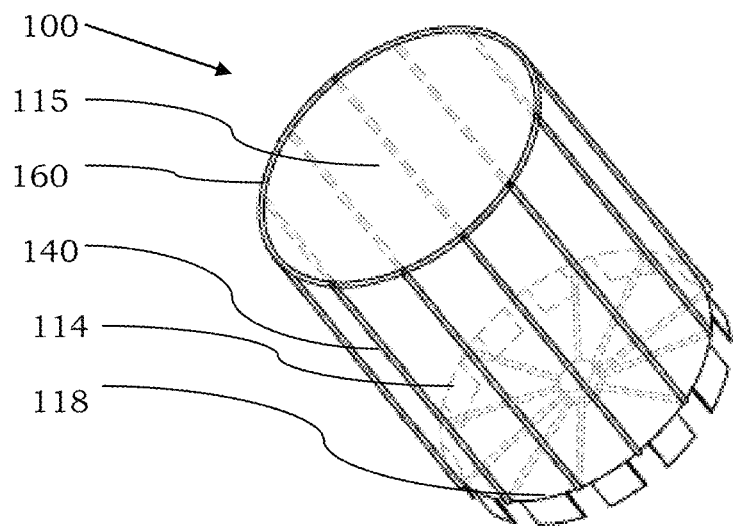
FIG. 4 is a perspective view of integrated planter and water distribution system.

The integrated planter and water distribution system 100 is seen in detail in FIGS. 2-6. The water distribution insert 100 consists of a planter 110 to hold a living plant. This planter 110 is vessel with an internal space 115 that is sized like most common household planters designed to accommodate a standard household plant. Such planters are generally six to eighteen inches in circumference and approximately twelve to twenty four inches deep. Household planters are well known in the art. As seen in FIG. 4, the planter 110 has an internal space 115, a top edge 116, a bottom 118, an inside surface 112 and an outside surface 114. The insert 100 can be made from a variety of material, the most common being soft flexible plastic of a type commonly referred to as Rubbermaid®. Many other plastics or polymers, or moderately hard rubber material is also suitable. It is also possible to make the planter 110 portion from metals, and the distribution tubing 140 from plastic, polymers, or rubber.

Figure 5:
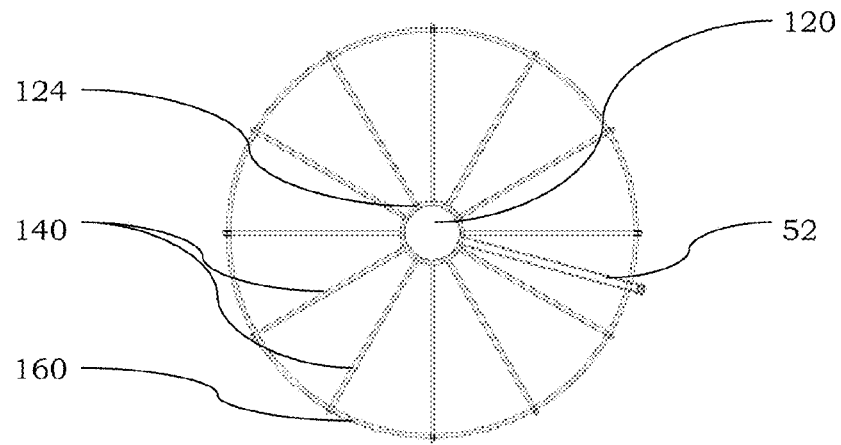
FIG. 5 is a top plan view of the water distribution system.
Figure 6:
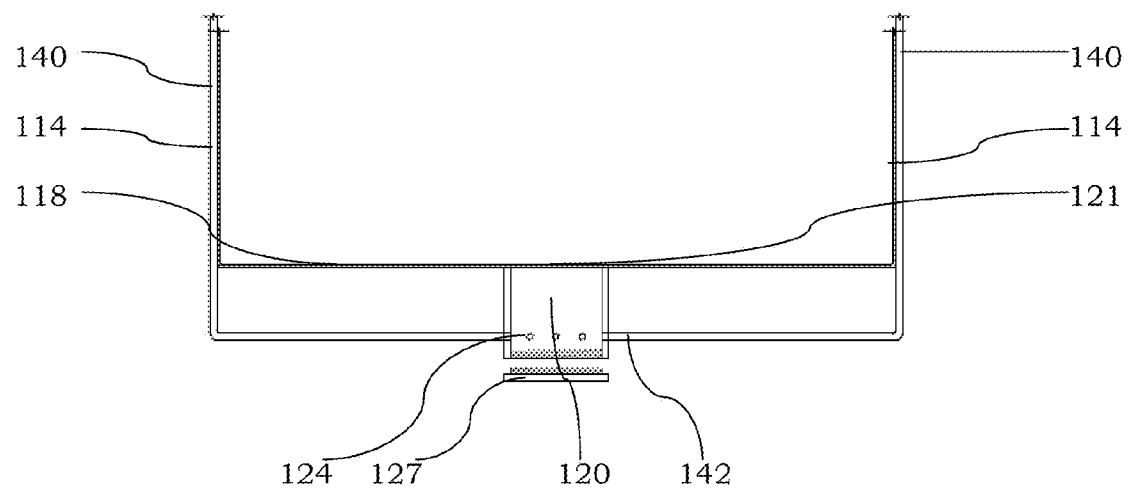
FIG. 6 is a side view of the water distribution system.

As best seen in FIG. 2, attached to the underside of the bottom 118 of the planter 110 is a distribution chamber 120. The distribution chamber 120 is a watertight hollow vessel with at least one water supply line 52 that supplies water into the distribution chamber 120. As seen in FIGS. 3, 5 & 6, the distribution chamber 120 also has a multiplicity of distribution outlets 124 that allow the water from within the distribution chamber 120 to flow into a multiplicity of distribution tubing 140. Each distribution tube 140 has an inlet end 142 hydraulically connected to the distribution outlet 124. In the most common configuration the distribution outlets 124 are hollow plastic prongs that are sized to fit within the inlet end 142 of the distribution tubing 140. In the most common configuration the distribution tubing 140 is small flexible plastic tubing of either one eight or one quarter inch diameter, and it is common and well known in the art to slide such tubing over similar supply sources.

In the most preferred embodiment the distribution chamber 120 is made from a piece of 6 inch PVC (polyvinyl chloride) pipe cut into a three inch section. As seen in detail in FIG. 6, a watertight top 121 is attached at the top portion of the pipe. The bottom of the distribution chamber 120 is threaded and a corresponding threaded end cap 127 is attached to create a watertight seal. In one configuration the top 121 of the distribution chamber 120 is attached to the underside of the bottom 118 of the planter 110. In an alternate embodiment the distribution chamber 120 can be cast from the same plastic as the planter 110.

A multiplicity of distribution outlets 124 are created around the outside wall of the distribution chamber 120. In one configuration these distribution outlets 124 are created by drilling holes into the pipe. There is also an inlet 125 in the distribution chamber which is hydraulically connected to the water supply line 52. The connection of such piping and tubing is well known in the plumbing trades.

The water supply line 52 can obtain water from a variety of sources. In one configuration, water is supplied to the supply line 52 through an external source, such as a standard household water supply. The water is supplied through a standard spigot and a hose that connects to the supply line 52. In this alternate embodiment of the invention there is no catch basin 14, and the water that flows from the waterfall will then drain directly onto the ground. This configuration will work when the waterfall 10 is on grass, bare ground, within a planter area, or near a drain.

In a second configuration, as seen in FIG. 7, there is a catch basin 14 locate within the base 12 to catch water as it flows down the waterfall 10 and redistribute it back to the water supply line 52. The catch basin has a low point, and there is an intake end of the supply line 52 that draws in water. There is a pump 50 in hydraulic connection with the intake line 52 which draws the water from the catch basin 14 and then pumps the water into the supply line 52 which supplies the water to the distribution chamber 120. In the variation depicted in FIG. 7, there is no intermediate tubing between the pump 50 and the distribution chamber 120. The pump 50 is a conventional water pump, which is well known in the art, and which is supplied with power through a power supply line 56 from an external power source. It is also within the conception of this invention for the pump 50 to have an internal battery power source, and such small pumps with internal battery power are well known in the art.

As seen in FIGS. 5 & 6, the distribution chamber 120 has a multiplicity of outlets 124 on the circumference of the distribution chamber 120, in a spoke like orientation. This allows water to flow evenly to all distribution tubing 140. As best seen in FIG. 4, the distribution tubing takes water from the distribution chamber 120 through the tubing, and up the outside 114 of the planter 110. In one configuration the distribution tubing 140 is attached to the outside 114 of the planter 110. In another configuration the tubing 140 is integral with the planter 110 and possibly molded from the same material. In a third variation the distribution tubing 140 is adjacent to, but not connected to, the outside 114 of the planter 110. The distribution tubing 140 is located on, adjacent, or integral with the planter 110 to keep it out of the way of the blocks 30.

The pedestal 20, as described above, is built around the integrated planter 110 and water distribution system. This allows the user to focus his or her time and effort on the construction of the pedestal 20 and the aesthetic features of the pedestal 20 and the waterfall 10, and not have to deal with task of separately constructing a water distribution system. In one variation of the present invention, the components are sold as a kit, and the purchaser can construct the waterfall 10 to his or her own desired specifications.

There are at least two possible configurations for supplying the water to the face 25 of the waterfall 10. In one configuration there is a water distribution outlet ring 160 that is attached just below the top edge 116 of the planter 110. The distribution tubing 140 has a flow end 144 that is at the opposite end of the tubing 140 from the inlet end 142. The flow end 144 is in hydraulic connection to the outlet ring 160. The outlet ring 160 has a multiplicity of small holes or openings 162 which allow the water to flow out. The outlet ring 160 is located at the top of the stone blocks 20, but below the cap stones 60. Water will flow out of the outlet ring 160 and through gaps left in the mortar between the top of the pedestal 20 and the bottom of the cap stones 60. This will allow the water to flow out onto the face 25 of the waterfall 10 in a natural manner. The position of the outlet ring 160 just below the top of the planter 110 will help prevent water from flowing into the planter and potentially overwatering and drowning the living plant in the planter.

In an alternate embodiment, the distribution tubing 140 run up the outside 114 of the planter 110, and then run through the space between various blocks 20. This can be seen in the alternate configuration shown in FIG. 7. The flow end 144 of the tubing 140 stops short of the face 25 of the waterfall so that the tubing 140 is not visible from outside. The tubing 140 runs through random blocks 20, so that the water cascades out of the waterfall in a random pattern. In this configuration the distribution tubing 140 will run between the blocks 30 and through the grout or other connecting material between the blocks 30 to the face 25 of the waterfall 10. The distribution tubing 140 will supply the water to the face 25 of the waterfall 10, to give the appearance of water bubbling from the rock of a waterfall.

In the preferred embodiment, the intake tube 52 is conventional half inch tubing, which can be made of any conventional tubing material, including but not limited to, plastic, PVC, rubber or metal. The distribution tubing 140 will be made from standard small bore conventional tubing, typically one quarter or one eighth inch tubing, made from any conventional tubing material, including but not limited to rubber, plastic, PVC or metals. Other slightly larger or slightly smaller tubing can be used for either the intake tube 52 or distribution tubing 140 depending upon the size and configuration of the system.

Flowers or living plants (not shown) may be placed in the planter 110. In the preferred embodiment, the configuration of the waterfall 10 in conjunction with the plants in the planter 110 is primarily for decorative purposes. This will combine the decorative and esthetic features of the waterfall 10 as described herein with the decorative and esthetic features of living plants, which are one of the most common indoor decorative features. When used in-doors, as contemplated in at least one of the disclosed embodiments, the planter 110 can hold any type of in-door plant. It is important to note that the disclosed water distribution system is hydraulically separate from the planter 110 such that the inside 115 of the planter 110 will remain dry and protect the living plant from excessive watering.

In operation of the alternate embodiment disclosed in FIG. 7, water is placed in the catch basin 14, and the pump 50 is activated. The pump 50 draws water from the catch basin 14 by means of the intake tube 52, and then pumps this water into the distribution chamber 120, which evenly distributes water into each of the distribution tubing 140. Water flows through the tubing 140, as described above, and then onto the face 25 of the waterfall in one of the two embodiments described above, and then into the catch basin 14, where it is then sucked back into the system by means of the intake tube 52 and pump 50.

One variation of the present invention is a kit containing the components set out above, and instructions for assembling the components into a finished stone waterfall with an incorporated planter and water distribution system. In this variation, the components of the water distribution system, including the inlet tube 52, the distribution chamber 120, and the distribution tubing 140 are all connected to the planter 110. This is for the convenience of the purchaser, so that the purchaser need only spend time on assembling the blocks 30 with the mortar to produce the desired configuration of pedestal 20. There will be two common variations of the kit. The first variation will come with the water distribution insert 100, which consists of the planter 110 and water distribution system, a sufficient number of blocks 30 to construct a pedestal 20, and dry mortar to join the blocks 30. The second variation will include the water distribution insert 100 only. Both kits will include detailed instructions for assembling the blocks 30 around the water distribution insert 100 to create a fully functional and aesthetically pleasing water feature with a living plant. It is also possible to include the combined water distribution insert 100 and the blocks 30, but not the mortar or grout. This will be for the convenience of the purchaser, so that the purchaser does not have to figure out how many blocks 30 are necessary to properly construct the waterfall 10.

Figure 8:
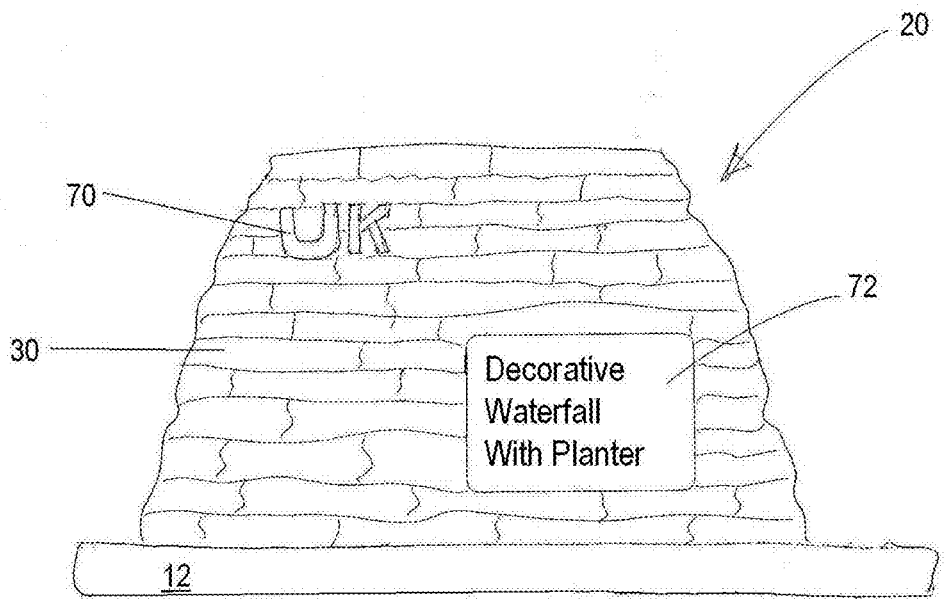
FIG. 8 is a side view of an alternate embodiment of the waterfall showing additional external features.

FIG. 8 depicts additional decorative features of the present invention. In alternate embodiments of the invention, indicia 70 may be provided. Indicia 70 is created by incorporating contrasting color stone or other material into the multiplicity of blocks 30 of the pedestal 20. The incorporation of such shapes into rock-work is well known in the stone working and masonry arts. Indicia 70 can be in the form of letters, numbers, shapes or symbols. In the representative example depicted in FIG. 8, the indicia 70 are the letters "U" and "K" which is the abbreviation for the University of Kentucky. As can be appreciated, indicia can be in a variety of different numbers and letters, and can represent a variety of different things, from the street number of a house or building to a person's initials, to the name of a company such as "IBM".

FIG. 8 further depicts a plaque 72 incorporated into the pedestal 20 of the waterfall 10. The incorporation of such a plaque into rock-work is well known in the stone working and masonry arts. The plaque 72 can be made from any type of suitably strong and sturdy material. In one embodiment it can be a single piece of stone. In alternate embodiments it can be a piece of concrete, ceramic, tile, metals or plastics. Words and phrases can be carved, etched or embossed on the plaque 72. The representative depiction of the plaque 72 in FIG. 8 is the title of this invention, but other examples can include, but are no way limited to, the name and address of the occupants of a house, honoraria for a retiree or graduate, or memorial for a departed loved one. It is also possible, and within the conception of the invention to incorporate the plaque 72, or other message into the base 12. The message can be any combination of words or symbols, such as street address or homeowner's name, and can be etched, carved, or engraved into the base 12. In an alternate variation the plaque 72 is attached to the pedestal by means of a plaque frame 75, which is sized to accommodate the plaque 72. In this configuration the plaque frame 75 is mounted into the blocks 30 of the pedestal 20 as described above. The plaque frame 75 will have a recessed magnet, and the plaque 72 will have a corresponding magnet or magnetic metal to allow it to be temporarily connected within the frame 75. This variation will allow the use of multiple plaques 72 with a variety of different words, symbols or messages. In an alternate variation a recessed space having a magnet is constructed through the placement of the blocks 30, and such adept placement of blocks is well known in the art. The plaque 72 associated with this variation will have an integrated magnetic metal backing plate to allow the plaque 72 to attach to the magnet within the recess.

The present invention is well adapted to carry out the objectives and attain both the ends and the advantages mentioned, as well as other benefits inherent therein. While the present invention has been depicted, described, and is defined by reference to particular embodiments of the invention, such reference does not imply a limitation to the invention, and no such limitation is to be inferred. The depicted and described embodiments of the invention are exemplary only, and are not exhaustive of the scope of the invention. Consequently, the present invention is intended to be limited only be the spirit and scope of the claims, giving full cognizance to equivalents in all respects.

I claim:

1. A portable natural stone waterfall with an integrated planter and water distribution system comprising:
   a planter for holding a living plant;
   a water distribution system attached to, but hydraulically separate from, said planter;
   a pedestal made from natural stone blocks, said pedestal built around said planter, and said pedestal having an external face, wherein said natural stone blocks are assembled into said pedestal by means of grout placed between said stone blocks;
   means for supplying water to said water distribution system;
   said water distribution system comprising;
   a water distribution chamber having an inlet and a multiplicity of outlets;
      an inlet tube connected to said inlet wherein said inlet tube comprises the means for supply water to said water distribution system;
      a multiplicity of distribution tubes connected to said multiplicity of outlets;
      wherein said distribution tubes comprise the means for supplying water to said external face of said pedestal;
   wherein said pedestal has a top, and wherein a cap stone ring is mounted at the top of said pedestal, and wherein there are a multiplicity of openings in the grout between said cap stone ring and the top of said pedestal;
   and wherein an outlet ring is connected to said multiplicity of distribution tubes, said outlet ring located adjacent to said multiplicity of openings, wherein said water flows from said outlet ring, through said multiplicity of openings and down said face of said pedestal to create the appearance of a small natural stone waterfall and provide the sound of cascading water.

2. The portable natural stone waterfall with an integrated planter and water distribution system of claim 1 wherein the water for the means for supplying water to said water distribution system comes from an external source.

3. The portable natural stone waterfall with an integrated planter and water distribution system of claim 1, further comprising:
   a base for supporting said pedestal;
   a catch basin consisting of a linear recess in said base, said catch basin situated in said base adjacent to said external face of said pedestal, said catch basin further comprising a drain located at a low point of said catch basin;
   a drain tube connected to said drain;
   a pump having an intake side and a supply side; wherein said drain tube is attached to said intake side and said supply side is connected to said inlet tube such that the pump transfers water from said catch basin to said distribution chamber to supply water to the external face of said pedestal.

4. The portable natural stone waterfall with an integrated planter and water distribution system of claim 1, wherein said multiplicity of distribution tubes run through the grout between said blocks to supply water directly to the external face of said pedestal.

5. The portable natural stone waterfall with an integrated planter and water distribution system of claim 1, further comprising indicia incorporated into said blocks of said pedestal.

6. The portable natural stone waterfall with an integrated planter and water distribution system of claim 1 further comprising a plaque mounted within said blocks of said pedestal wherein said plaque provides a visible symbol or readable message.

7. The portable natural stone waterfall with an integrated planter and water distribution system of claim 1 further comprising a plaque frame mounted within said blocks of said pedestal, said plaque frame a recess sized to receive a removable plaque.

8. A small portable natural stone waterfall comprising;
   a planter with incorporated water distribution system;
   a pedestal constructed from a multiplicity of natural stone blocks and built around said planter, said pedestal having an external face;
   said planter comprising a body having an interior space sized to accommodate a living plant and an exterior with a bottom, sides, and a top;
   said water distribution system consisting of a distribution chamber mounted on the bottom of said planter, said distribution chamber having a water inlet for supplying water to said chamber and a multiplicity of water outlets dispersed around the outside of the chamber;
   a water supply connected to said water inlet;
   a multiplicity of water distribution tubes in hydraulic connection to said multiplicity of water outlets, said distribution tubes attached to, and running up the sides of said planter; and
   means for supply water from said distribution tubes to said external face of said pedestal;
   wherein said means for supplying water consists of an outlet ring having a multiplicity of small holes mounted at the top of said planter, and wherein said pedestal further comprises a top having a number of cap stones mounted to said pedestal top by means of grout, and wherein further there are a multiplicity of random gaps in said grout such that water will flow from said small holes of said outlet ring, through said random gaps and onto said external face of said pedestal to created the appearance of a miniature natural waterfall.

9. The small portable natural stone waterfall of claim 8 wherein said water supply consists of an external water source.

10. The small portable natural stone waterfall of claim 8 wherein said water supply consists of re-circulated water wherein said pedestal sits on a base having a water catching recess adjacent to said external face of said pedestal, said recess having a low portion and a drain situated at said low portion, a drain tube connected to said drain, a pump connected to said drain tube, said pump connected to said water inlet, wherein water is provided to said recess, said pump is activated, drawing said water from said drain through said drain tube and supplying water to said distribution chamber, wherein further said water flows from said distribution chamber through said multiplicity of water outlets and through said multiplicity of water distribution tubes to supply water to said external face of said pedestal.

11. The small portable natural stone waterfall of claim 8, wherein said means for supplying water consists of said water distribution tubing being of sufficient length to extend to the external face of said pedestal, and wherein said pedestal is constructed with mortar between said stones, and wherein said distribution tubing runs through said mortar to near said external face.

12. The small portable natural stone waterfall of claim 8, further comprising indicia incorporated into said blocks of said pedestal.

13. The small portable natural stone waterfall of claim 8 further comprising a plaque mounted within said blocks of said pedestal wherein said plaque provides a visible symbol or readable message.

14. The small portable natural stone waterfall of claim 8 further comprising a plaque frame mounted within said blocks of said pedestal, said plaque frame a recess sized to receive a removable plaque.

\* \* \* \* \*